United States Patent [19]
Smith et al.

[11] Patent Number: 5,404,510
[45] Date of Patent: Apr. 4, 1995

[54] DATABASE INDEX DESIGN BASED UPON REQUEST IMPORTANCE AND THE REUSE AND MODIFICATION OF SIMILAR EXISTING INDEXES

[75] Inventors: Gregory S. Smith; Sangam Pant, both of Nashua, NH.

[73] Assignee: Digital Equipmetn Corporation, Maynard, Mass.

[21] Appl. No.: 886,751

[22] Filed: May 21, 1992

[51] Int. Cl.⁶ .............................................. G06F 15/40
[52] U.S. Cl. ........................ 395/600; 345/425; 345/934; 364/419.07; 364/419.19; 364/974.6; 364/DIG. 2; 364/282.1; 364/DIG. 1
[58] Field of Search .................. 345/600, 425; 364/419.07, 419.19

[56] References Cited

U.S. PATENT DOCUMENTS

| | | | |
|---|---|---|---|
| 4,468,732 | 8/1984 | Raver | 395/600 |
| 4,956,774 | 9/1990 | Shibamiya et al. | 345/600 |
| 5,043,872 | 8/1991 | Cheng et al. | 345/600 |

OTHER PUBLICATIONS

Rullo et al, "An Automatic Physical Designer for Network Model Databases", IEEE Transactions on Software Engineering, vol. 14, No. 9, Seisterploer, 1988 pp. 1293-1306.

Baraucci et al, "Optimal Selection of Secondary Indexes", IEEE Transactions on Software Engineering, vol. 16, No 1, Jan. 1990, pp. 32-38.

Falkowski, "Comments on an Optimal Set of Inducers for a Realational Data base", IEEE Transactions on Software Engineering, vol. 18, No. 2, Feb. 1992 pp. 168-171.

S. Finkelstein, et al., *Physical Database Design for Relational Databases*, IBM Almaden Research Center, ACM Transactions on Database Systems, vol. 13, No. 1, Mar. 1988, pp. 91-128.

U.S. Patent Application 485,376, filed Feb. 26, 1990, Applicant, Michael E. Gioielli et al., Title: Physical Database Design System.

*Primary Examiner*—Thomas G. Black
*Assistant Examiner*—Paul R. Lintz
*Attorney, Agent, or Firm*—Hamilton, Brook, Smith & Reynolds

[57] ABSTRACT

Design of indexes in a relational database management system is based on a workload analysis of all requests in a system. Each request is assigned a value of importance, and requests are broken into expressions, contexts and columns to facilitate identification of candidate indexes. Candidate indexes are compared to existing indexes to determine whether the existing indexes can be reused or modified. Candidate indexes are classified as hashed or sorted. Based on the index design, record placement is selected to be hashed, sorted or by default. Related indexes and tables are clustered and the clusters are sized to fit file areas. Cache buffers are also defined.

51 Claims, 7 Drawing Sheets

REQUEST

FIG. 11A

| ID | IMPORTANCE | # OF EXP |
|---|---|---|
| 1 | 43.7 | 2 |

EXPRESSION

FIG. 11B

| REQ | EXPRESSION | VERB | # OF CONTEXT |
|---|---|---|---|
| 1 | 1 | SELECT | 1 |
| 1 | 2 | SELECT | 1 |

CONTEXT

FIG. 11C

| REQ | EXPRESSION | CONTEXT | TABLE NAME |
|---|---|---|---|
| 1 | 1 | 1 | EMPLOYEES |
| 1 | 2 | 1 | MANAGERS |

SELECT-COLUMN

FIG. 11D

| REQ | EXPRESSION | CONTEXT | COLUMN |
|---|---|---|---|
| 1 | 1 | 1 | LAST NAME |
| 1 | 2 | 1 | ID |

WHERE-COLUMN

FIG. 11E

| REQ | EXPRESSION | CONTEXT | COLUMN | OPR | JOIN |
|---|---|---|---|---|---|
| 1 | 1 | 1 | FIRST NAME | = | NO |
| 1 | 1 | 1 | EMPLOYEE ID | = | YES |
| 1 | 2 | 1 | STATUS | = | NO |

DATABASE INDEX DESIGN BASED UPON REQUEST IMPORTANCE AND THE REUSE AND MODIFICATION OF SIMILAR EXISTING INDEXES

BACKGROUND OF THE INVENTION

In a relational database system, many individual records of data are stored in tables. Each table identifies fields, or columns, and individual records are stored as rows, with a data entry in each column. For example, in an employment database, there may be a table EMPLOYEES which comprises fields, or columns, such as employee ID, last name, first name, address, city, state and so forth. One record, including data in the several columns, would be entered in the EMPLOYEE table for each employee. Similarly, other tables would be established in accordance with the logical schema of the database. For example, a table SALARY HISTORY may include columns of salary history information, with each record being identified by an employee ID. Another table MANAGERS may include columns identifying information specific to managers and may also include the employee ID field. Relations between tables can be established by reference to the columns which appear in multiple tables, such as employee ID in the above example.

A major task in database management systems is in locating specific records within individual tables based on the specifics of one or more columns which are used as keys in the search process. To that end, the system may scan through every entry in a particular table to locate the desired records. However, the table may span multiple pages and scanning an entire table might require multiple time consuming input/output (I/O) operations.

To reduce the time required to locate particular records, indexes may be established. In a sorted index, for example, all entries in a column of a table are sorted and listed as keys in ascending or descending order within an index. The index provides a pointer from each entry in the index to a corresponding record in the table. Because the data in the index is sorted, a desired key can be located quickly, and direct access to the desired record is then obtained. Moreover, the size of an index record is generally less than that of its table; thus it is cheaper to scan indexes than tables. Another form of indexing is a hash index. In that case, a system hash function is applied to column data which serves as the key to the index in order to locate a page of the index. Within that page, the key is located to obtain a pointer to the record.

Indexes have the advantage of providing more direct access to individual records and thus of reducing search time, including costly I/O operations, to locate the records. However, the indexes come with the cost of added storage space and an increase in time required to insert or delete records or update records. Whenever a record is inserted or deleted, the system must not only process the record in the table but also any indexes which include columns of the table. Further, updating a record can require relocation of the corresponding entry in one or more indexes.

A user defines the logical design of a database, including the tables and columns. The user also identifies a workload of requests to the database for which the database system locates and operates on data in the tables. In a physical design of the database, the user would generally also establish any indexes which the user would expect to improve performance of the database system. A typical database management system includes an optimizer which, with any request during execution, selects the optimum predefined indexes, if any, to locate particular records.

Other features of the physical design of a database also affect performance. By properly placing records within tables, clustering tables and indexes within files, sizing and locating files, and selecting buffers, the number of input/output operations during processing can be minimized.

A prior physical design system is presented in U.S. patent application Ser. No. 485,376, abandoned, filed by Michael E. Gioielli et al. and Ser. No. 485,372, abandoned, filed by Philip K. Royal, both filed on Feb. 26, 1990 and assigned to the assignee of this invention.

SUMMARY OF THE INVENTION

The present invention is related to a knowledge based system which looks at the logical schema and workload of a database, including specifics of tables and requests, to establish indexes which provide for efficient operation of the database system. The indexes are identified based on a detailed analysis of the workload, with weight given to the importance of specific requests. Once the indexes are identified, the system may then design for other physical features of the database. Placement strategy of records within tables is identified, tables and indexes are clustered within files and files are sized and located within the available storage space. I/O buffers may also be designed.

More specifically, a database has plural tables, each of plural columns, stored in memory under control of a processor. The columns are logical columns indicating logically grouped and indexable data elements without any requirement for physical columnation. In accordance with the present invention, indexes are generated by first identifying importance values for individual database requests. Indexes to tables for the requests are designed through a procedure of identifying new indexes, reusing existing indexes and modifying existing indexes based upon match between existing indexes and candidate indexes and upon the importance values of requests for which the indexes are created. Preferably, the importance value of a request is identified from individual importances of the request, the transaction which includes the request and the program which includes the transaction. The program importance is weighted more than the transaction importance which in turn is more weighted than the request importance.

In a relational database language such as structured query language (SQL), an expression is formed on each verb of a request. Within each expression each table, and its associated columns, forms a context. In a preferred system, columns and associated operators for individual table contexts are identified within each expression of each request. The candidate indexes are then identified from the columns for individual contexts by order of request value of importance. A candidate index is chosen only when the database management system will use the index based on the operators and datatypes of the respective context. Moreover, a candidate index is not chosen when the table of the context does not have sufficient cardinality, and when a column size (data length) in the context is above a threshold size. With identification of each candidate index, the system searches previously identified indexes for an existing index that is similar to the candidate index. The best existing index may be determined as a function of match of columns and keys of the indexes, with greater weight being given toward match of keys. The system then chooses from the steps of a) creating a new index, b) reusing the best existing index and c) modifying the best existing index to satisfy the context of the candidate index. Choice of steps a, b and c is dependent on match between the candidate index and the best existing index and the values of importance of the requests for which the indexes are identified.

In determining whether a new index should be created, or whether a preexisting index should be reused or modified, a number of novel rules are processed:

1. The best existing index is reused for a candidate index if both indexes are hashed, both indexes have the same number of columns and all the columns match.

2. The best existing index is reused if the best existing index is sorted, the candidate index is hashed, both indexes have the same number of columns and all the columns match in identity.

3. The best existing index is reused if both indexes are sorted, both indexes have the same number of columns and all the columns match in identity and in position.

4. The best existing index is reused if the best index is sorted, the candidate index is either hash or sorted, the best existing index has more columns and the columns of the candidate index match, in identity and in position, the leading segments of the best existing index.

5. The best existing index is changed to the candidate index if the best existing index is hash, the candidate index is sorted, the indexes have the same number of columns, the columns match in identity, and if importance of the candidate index exceeds a threshold relative to importance of the best existing index.

6. The best existing index is changed to include the candidate index if the best existing index is hash, the candidate index is either hash or sorted, the best existing index has lesser number of columns, all the columns of the best existing index match in identity and the importance of the candidate index exceeds a threshold relative to importance of the best existing index.

7. The best existing index is changed to the order and type of the candidate index if the best existing index is hash, the candidate index is either hash or sorted, the best existing index has more columns, all columns of the best existing index match in identity and the importance of the candidate index is greater than a threshold relative to the importance of the best existing index.

8. The best existing index is changed to the candidate index if the best existing index is sorted, the candidate index is either hash or sorted, the best existing index has a lesser number of columns, the columns of the best existing index match in identity and position, and the importance of the candidate index is greater than a threshold relative to the importance of the best existing index.

9. The best existing index is reused if only some of the columns between the indexes match and the importance of the candidate index is less than a threshold relative to the importance of the best existing index.

From the above, it can be seen that whether an index is reused or modified is determined as a function of importance of the existing and candidate indexes and of the retrieval modes, that is hash or sorted, of the indexes.

Once a set of indexes is established, indexes are pruned by the system where the benefit of an index is determined to be less than the cost of the index in operation of the database management system. In particular, benefits may be derived from the importance of requests which will use the index, and cost may be derived from the importance of requests which result in changes to the indexed table. The changes may be due to insert and delete requests on the indexed table or due to update requests on indexed columns.

Columns may be added to the established indexes in order to provide for index-only retrieval. Columns may also be added where the cardinality of the index is below a threshold in order to extend binary searches and thus improve performance of certain database management systems.

The system may also establish hashed or sorted record placement strategy within selected tables. The strategy is established dependent on importance of the indexes to the table, on retrieval mode of indexes to the table and on datatypes of columns within the table. Record placement strategy is also based on table volatility.

With the indexes defined, the system may establish cluster groups of tables and/or indexes. In particular, the system clusters both indexes and tables having parent/child relationships. Specifically, the tables and indexes are clustered together where the tables are placed via hashed indexes and the tables are joined using columns in the hashed indexes. Other clusters include tables and hashed indexes where the tables are placed via the hashed indexes, separate table and index clusters where the tables are placed via sorted indexes, separate clusters for all secondary hash indexes, a cluster for system files and a cluster for root files. All tables and indexes that are not a part of a cluster are put in a default cluster. All segmented strings are put in another default cluster. Tables, indexes and segmented strings of importance over a threshold or volatility over a threshold are shadowed out of the default clusters and placed in separate clusters. An entity from a cluster may also be shadowed or partitioned due to space constraints.

Clusters are sized depending on the database management system sizing guidelines and buffers are recommended accordingly. Once clusters are defined, they become the basis for area files and these may be assigned to particular storage devices as a function of the disk rank, available disk space and importance of entities within the area. The most important entity would thus be assigned to the higher rated device.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views.

FIGS. 11A through 11E illustrate example entries in tables set up during request analysis of FIG. 3.

DETAILED DESCRIPTION OF PREFERRED EMBODIMENT

Figure 1:
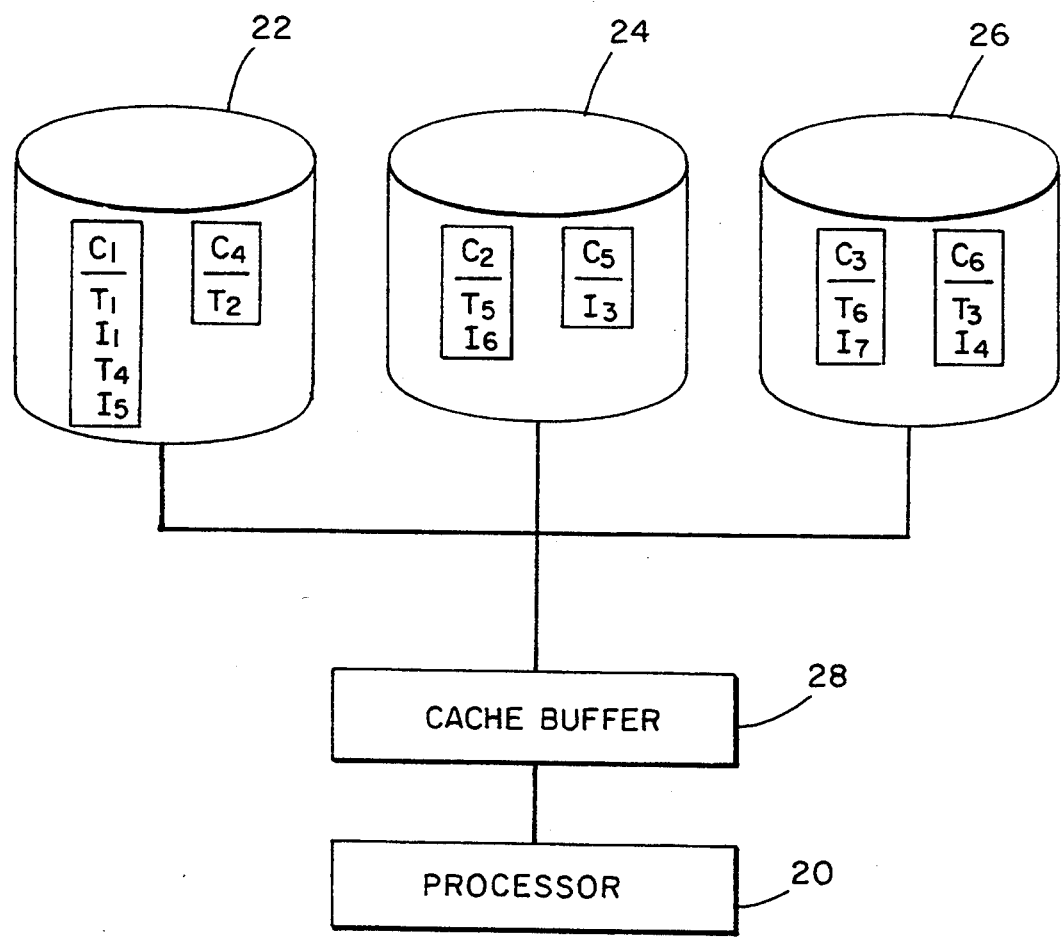
FIG. 1 is a schematic illustration of a database management system embodying the present invention.

FIG. 1 is a schematic illustration of a database management system embodying the present invention. All data processing is performed in a processor 20. The processor includes local memory from which data is retrieved for processing and to which it is returned after processing. Due to the high cost of local memory, few systems have sufficient local memory to store all of the data and programs to be processed. Therefore archival storage units such as 22, 24 and 26 are provided. Typically, archival storage is in the form of disk storage and/or magnetic tape storage. The archival storage units themselves may have different speeds and capacities.

Stored in archival storage are the database and software, including the database management system software and the physical design system software described below.

Because I/O operations are extremely expensive in time consumption, blocks of data are retrieved in single I/O operations. Hopefully, a single block carries the information required for an extended sequence of processing. Since processing generally carries forward over multiple blocks and may return to recently retrieved blocks, the processor is able to retrieve and store multiple blocks in a cache buffer 28. Individual blocks can be exchanged with the cache buffer rapidly, and as long as the required data is within blocks in the buffer, the expensive I/O operations are avoided. Performance of a system is strongly dependent on the sizes and number of blocks which may be stored in the cache buffer.

Within the archival storage, the data is stored in clustered files identified as C1–C6. Each file typically has many pages and a number of pages are typically retrieved as a block in an I/O operation. As illustrated, the clusters may include various combinations of tables T and indexes I. Part of the physical design of a database is in storing data which will likely be required together in the same or adjacent pages for simultaneous retrieval. Even if data is not retrieved in a single block, if successive blocks are located in adjacent segments of disk storage, the I/O operation can be shortened.

Indexes can also minimize I/O operations in a system. In searching for particular data within a table without an index, the processor would scan the entire table which may span many I/O blocks. Indexes provide more direct access to the desired record. Where an index is sorted, a binary search allows for rapid location of specific data within the index and the index then points directly to the desired records within the table, so the entire table need not be scanned. In the case of a hash index, the hash function identifies a single page which carries that portion of the index of interest. Again, the index provides a direct pointer to the record of interest.

Although the user generally establishes the indexes which are available for accessing the tables, database management systems typically include a query optimizer/executor which analyzes each request, which may be in the structured query language (SQL), to identify the optimal access paths, possibly through indexes, to the required record.

The I/O operations can be further reduced by assuring that a hashed index is stored together with a table which it indexes. Thus, in one I/O operation through a hash function, the processor 20 may have available to it both the index and the table which is being accessed. Where a parent/child relationship is established by request, of the database management system, that is, where one operation leads to and is required to complete another, I/O operations can be minimized by storing both the parent and child tables and their respective indexes together.

Of course, many different requests are likely to access the same tables through different keys which require different indexes. Therefore, clustering of tables and indexes may be particularly efficient for one operation but particularly inefficient for another operation.

Also, indexes come at a cost, not only in storage space but in potential additional I/O operations with insertions, deletions and updates of records in indexed tables. When a record is inserted or deleted, every index entry which points to that record must also be inserted or deleted. If data is updated, every index which relies on the updated data as a key may require relocation of the indexed data. Thus, whether an index is desirable is dependent on how often the data must be inserted, deleted or updated. In this respect, the index may be desirable for certain requests of the system but be particularly undesirable for more volatile requests.

In accordance with the present invention, the importance of specific requests within the workload, i.e., applications running on the database, are considered in establishing an index. Indexes are established to best suit the more important requests, and less important requests may be forced to rely on indexes of the more important requests. Also, indexes may be modified to enable the use of common indexes by plural requests. Finally, unimportant and volatile indexes may be pruned from the system.

The present system has been designed particularly for index design and physical design of databases processed by the Rdb/VMS database management system available through Digital Equipment Corporation, but is also applicable to other relational database management systems. Physical features of those relational database systems for which the present system is particularly suited include the following:

1. A query optimizer/executor that will analyze the SQL queries to run the database and use the physical features available in the database to generate the appropriate query result.

2. Support for indexes that are used by the query optimizer/executor to facilitate efficient data retrieval for satisfying the query result. Indexes may be of types hashed and/or sorted. For efficiency, the maximum size of an index may be limited to a threshold value, the datatypes of the columns in an index may be restricted (e.g., large data entries like segmented strings may not be allowed), and the index may have an associated node size and/or usage criterion.

3. An I/O subsystem that performs data retrieval from the disk. The subsystem may support record placement strategies for efficient retrieval. Records may be placed via the order of the index or by a default algorithm. The subsystem may also support caching of data into buffers for reducing disk I/O.

4. Support for cluster groups such that related entities (e.g., tables, indexes) can be placed together and their retrieval optimized.

5. Support for multiple areas (physical data files) to efficiently store clusters of entities. The areas may have specific features to determine the type of the area, size of the area, growth, etc. that may be used to improve the data access time. The area may also support an associated snapshot file mechanism. Data from an entity may be partitioned across several areas and within the area the data may be stored in a compressed format.

Figure 2:
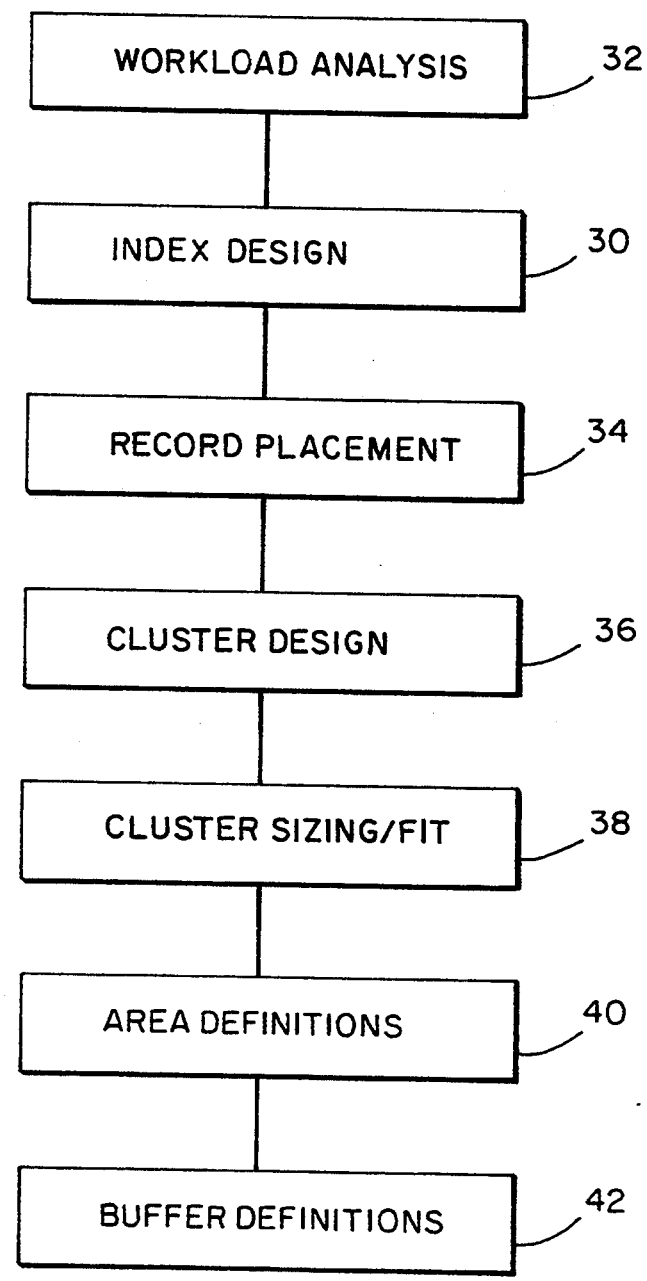
FIG. 2 is a flow chart of the overall indexing and physical design process performed by the system of FIG. 1.

As illustrated in FIG. 2, the index design 30 of the present invention follows and is based on a detailed work analysis 32 of the system. With the workload analysis and indexes in hand, the system defines optimal record placement 34, cluster design 36, cluster sizing and fit 38, storage area 40 and buffer size and number 42. Those elements of the system are described in detail below.

Figure 3:
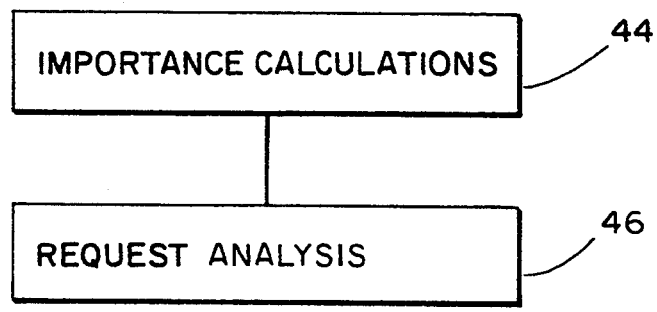
FIG. 3 is a flow chart of the workload analysis of FIG. 2.

As illustrated in FIG. 3, the first step of the workload analysis 32 is the importance calculation 44. The user is asked to provide importance or priority ratings to each request, each transaction within which requests are made, each program which includes the transactions and each application which may include plural programs. Also, the user is asked to provide, or the database system or any other tool may provide from a statistical analysis over time, the expected frequency of requests. From these values, the system computes absolute importance of each SQL request:

---
absolute_importance = exp(log(imp +
    exp(log(absolute_frequency))))
imp = (app_imp*1000) + (prog_imp*100) + (trans_imp*10) +
    req_imp
absolute_frequency = number of times a request will
    execute in a year.
---

Thus, each request is normalized relative to its transaction, program and application with greater weighting to the importance of the transaction, even greater weighting to the importance of the program, and greatest weighting to the importance of the application. The weighting values shown are preferred but may be user defined parameters. Due to the exponential function of frequency, frequency has a lesser bearing on absolute importance than the importance designations. The overall exponential function avoids extreme variance between data points and bounds the range of absolute importance values.

With a calculated importance value for each request in the system, the individual requests themselves are analyzed at 46. Each request is broken up into one or more expressions which have an associated verb (Insert, Delete, Update, Select). An expression is then broken up into one or more contexts. Each context has an associated table and may have various associated where_columns, select_columns, update_columns, group_by_columns and order_by columns. The context then becomes our basis for index design.

As an example, consider the following SQL request.

---
SELECT E.LAST_NAME FROM EMPLOYEES E
    where E.FIRST_NAME = "GREG"
---

-continued
---
and E.EMPLOYEE_ID = ANY (SELECT A.ID FROM
    MANAGERS A
    where A.STATUS = "ACTIVE")
---

The request includes one expression identified by the first select verb and a sub-expression identified by the second select verb. This request looks to two tables, EMPLOYEES and MANAGERS. The table EMPLOYEES includes columns last name, first name and employee ID which are within a context E. The MANAGERS table includes the columns ID and status within a context A. In processing this request, the database management system may first locate all records in the MANAGERS table in which the entry in the column status was active. With the ID's identified in that table, the system may then check in the EMPLOYEE table for all records in which the ID was as previously identified and in which the first name was Greg. From the thus identified records in the EMPLOYEE table, last names may then be fetched.

The request analysis establishes its own database to ease analysis in subsequent routines. Specifically, it establishes a REQUEST table having a record for each request, an EXPRESSION table with each expression within each request, and a CONTEXT table with each context within each expression. Further, tables are established with respect to all select_columns, where_columns, order_by_columns, update_columns and group_by_columns. Those tables are presented in detail as follows:

REQUEST table

| | | |
|---|---|---|
| pschema | integer | Physical schema id. |
| request | integer | Request object id. |
| transaction | integer | Parent transaction id. |
| name | char(31) | Request name. |
| expression_count | integer | Number of unique expressions within this request. |
| frequency | double precision | Frequency value for this request. |
| importance | double precision | Absolute importance of this request. |

EXPRESSION table

| | | |
|---|---|---|
| pschema | integer | Physical schema id. |
| request | integer | Request object id. |
| expression | integer | Expression id. Unique within request. |
| context_count | integer | Number of unique context groups within this expression. |
| verb | smallint | Verb associated with this expression. |

CONTEXT table

| | | |
|---|---|---|
| pschema | integer | Physical schema id. |
| request | integer | Request object id. |
| expression | integer | Expression id. Unique within request. |
| context | integer | Table context id. Unique within request. |
| table | integer | Parent table object id. |
| select_by_dbkey | smallint | 1 if the context group is retrieved by DBKEY. |
| where_count | integer | Number of columns used in where clause for this context. |
| select_count | integer | Number of columns used in select column list for this context. |
| update_count | integer | Number of columns referenced in update clause for this context. |
| group_by_count | integer | Number of columns used in a group |

-continued

CONTEXT table

| | | |
|---|---|---|
| order_by_count | integer | by clause for this context. Number of columns used in an order by clause for this context. |
| index | integer | Index for which this context group is satisfied. |

SELECT_COLUMN table

| | | |
|---|---|---|
| pschema | integer | Physical schema id. |
| request | integer | Request object id. |
| expression | integer | Expression id. Unique within request. |
| context | integer | Table context id. Unique within request. |
| table | integer | Parent table object id. |
| column | integer | Column object id. |
| position | integer | Determines relative position in list. |
| agg_flag | smallint | 1 if column is part of an aggregate. |

WHERE_COLUMN table

| | | |
|---|---|---|
| pschema | integer | Physical schema id. |
| request | integer | Request object id. |
| expression | integer | Expression id. Unique within request. |
| context | integer | Table context id. Unique within request. |
| table | integer | Parent table object id. |
| column | integer | Column object id. |
| cardinality | double precision | Column cardinality. |
| position | integer | Determines relative position in list. |
| operator | smallint | Database operator used in the predicate. Valid values are PDD_K_OPERATOR_EQ, PDD_K_OPERATOR_LEQ, PDD_K_OPERATOR_GEQ, PDD_K_OPERATOR_LSS, PDD_K_OPERATOR_GTR and PDD_K_OPERATOR_OTHER. |
| retr_mode | smallint | Retrieval mode for the predicate. Valid values are PDD_K_RETR_MODE_SEQUENTIAL, PDD_K_RETR_MODE_DIRECT, PDD_K_RETR_MODE_RANGE, and PDD_K_RETR_MODE_DBKEY. |
| cartesian | smallint | 1 if the predicate would cause a cartesian product. |
| rhs_context | integer | If the column participates in a join, this column will contain the context id of the opposite side of the operator. |
| rhs_table | integer | If the column participates in a join, this column will contain the table id of the opposite side of the operator. |
| rhs_column | integer | If the column participates in a join, this column will contain the column id of the opposite side of the operator. |

UPDATE_COLUMN table

| | | |
|---|---|---|
| pschema | integer | Physical schema id. |
| request | integer | Request object id. |
| expression | integer | Expression id. Unique within request. |
| context | integer | Table context id. Unique within request. |
| table | integer | Parent table object id. |
| position | integer | Determines relative position in list. |
| column | integer | Column object id. |
| rhs_flag | smallint | 1 if column appears on the righthand side of the equal sign. |

ORDER_BY_COLUMN table

| | | |
|---|---|---|
| pschema | integer | Physical schema id. |
| request | integer | Request object id. |
| expression | integer | Expression id. Unique within request. |
| context | integer | Table context id. Unique within request. |
| table | integer | Parent table object id. |
| position | integer | Relative position in list. |
| column | integer | Column object id. |
| descending | smallint | 1 if column is sorted in descending order |

GROUP_BY_COLUMN table

| | | |
|---|---|---|
| pschema | integer | Physical schema id. |
| request | integer | Request object id. |
| expression | integer | Expression id. Unique within request. |
| context | integer | Table context id. Unique within request. |
| table | integer | Parent table object id. |
| position | integer | Relative position in list. |
| column | integer | Column id in pdd$pd_columns table. |

Some entries in the above tables for the above example request are presented in FIGS. 11A through 11E. Although the entries for only one request are shown, it should be recognized that these tables are opened ended and that the related data for all requests would be included in the tables by order of importance of the requests.

In this example, from the REQUEST table it can be seen that request one having an importance of 43.7 has been broken down to two expressions. From the expression table, expression one has a verb "select" and one context while expression two has the verb "select" and one context. The contexts are identified in the context table. The first and only context of the first expression is that of the EMPLOYEE table, and the first and only context of the second expression is that of the MANAGER table. Each context includes a select_column. The select column of the first context of the first expression is last name, and that of the first context of the second expression is ID. Finally, the first expression includes two where_columns, first name and employee, each having an equality operator. The first where_column does not include a join operation but the second does. Similarly, the context of the second expression includes a single where_column, status, having an equality operator and no join operation.

Figure 4:
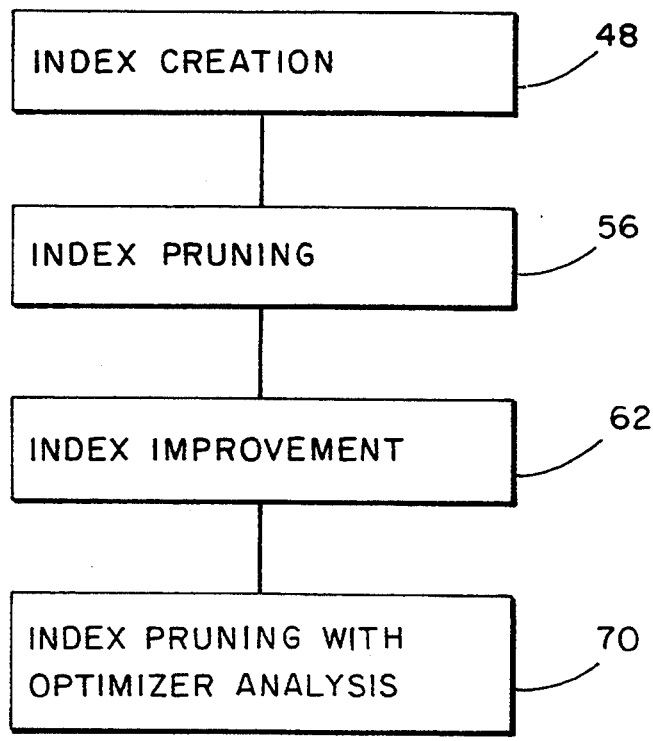
FIG. 4 is a flow chart of the index design of FIG. 2.
Figure 5:
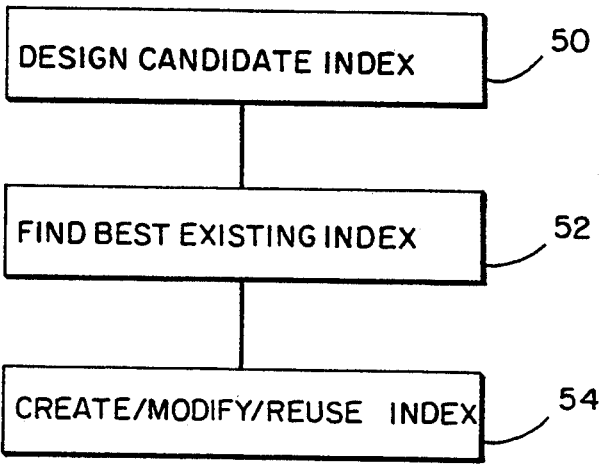
FIG. 5 is a flow chart of the index creation of FIG. 4.

With the entire workload, i.e., applications running on the database management system, broken into expressions, contexts and columns, the system is able to proceed to the index design 30 which is presented in FIG. 4. There, each context is analyzed in descending order of absolute importance to determine whether it can be used as a basis for index creation. The where_columns, group_by_columns and order_by_columns of a context are analyzed separately to form candidate indexes. In the example above, context one of expression one of request one suggests an index on first name and employee ID. From the where_column for context one of expression two of request one, an index to status is suggested.

Depending on the capability of the I/O subsystem in a relational database system, contexts on tables having cardinality below a certain threshold value may be bypassed and consequently not used as a basis for index. This is because the I/O subsystem may retrieve the whole table in a single fetch and an in-memory sequential scan of the data may be cheaper than an indexed retrieval. Columns that have operator types NOT EQUAL, LIKE, SUBSTRING, CONTAINING, MATCHING etc. may be bypassed as candidate index columns because query optimizers in some relational database systems may not use them. Columns that are greater than a certain threshold size, or that will cause the candidate index size to be greater than a threshold size, may be bypassed, as certain relational database systems limit the total index length to a threshold value. Columns that are of specific datatypes (e.g., computed or segmented string) may also be bypassed, as certain relational database systems may not allow columns of such datatypes to be part of an index.

The retrieval mode for columns in the candidate index is set as direct or range depending on the operators that act on the columns. Candidate indexes with direct retrieval mode are potential hash indexes and columns having range retrieval mode are potential sorted indexes. Candidate indexes used for group_by and order_by clauses will always have a range retrieval mode if the optimizer for the relational database system considers using only sorted indexes to satisfy these clauses.

The first candidate index, which is from the request of greatest importance, is placed in an index table and index column table as follows:

| INDEX table | | |
|---|---|---|
| pschema | integer | Physical schema id. |
| index | integer | Index id. |
| name | char(31) | Name of index. |
| table | integer | Parent table object id. |
| placed | smallint | 1 if index is placed with its parent table. |
| type | integer | Index type. Valid types are: PDD_K_IN-DEX_TYPE_HASHED and PDD_K_IN-DEX_TYPE_SORTED. |
| record_size | integer | Uncompressed record size of index key. |
| comp_record_size | integer | Compressed record size. |
| node_size | integer | Index node size. |
| keys_per_node | integer | Number of index keys that will fit into a single node. |
| duplicate_nodes | integer | Number of duplicate nodes for a key. |
| dup_nodes_per_page | integer | Number of duplicate nodes placed on a single page. |
| nodes_per_page | integer | Number of index nodes per database page. |
| comp_factor | real | Data compression factor. |
| overhead_size | integer | Number of overhead bytes for each key. |
| total_size | integer | Total bytes to store 1 record occurance including overhead. |
| fill | integer | Index fill factor. |
| usage | integer | Index usage flag. Valid values are PDD_K_IN-DEX_USAGE_QUERY and PDD_K_IN-DEX_USAGE_UPDATE. |
| importance | double precision | Total importance of all requests that will use index. |
| max_importance | double precision | Maximum importance of all requests that will use index. |
| avg_importance | double precision | Average importance of all requests that will use index. |
| cardinality | double precision | Number of unique index keys. |
| request_count | integer | Number of requests that will use this request. |
| column_count | integer | Number of index segments. |
| direct_count | integer | Number of equality lookups by requests. |
| range_oount | integer | Number of inequality lookups by requests. |

| INDEX table -continued | | |
|---|---|---|
| required | smallint | Required flag. If 1, then index will appear in new design regardless of importance. |
| h_partition_count | integer | Number of horizontal partitions for this index. 1 means no partitioning. |
| v_partition_count | integer | Number of vertical partitions for this index. |
| duplicates | smallint | 1 if duplicates are permitted. |
| cluster | integer | Cluster group id. |
| user_changed | smallint | Boolean whose value is 0 if the user has not altered the index and 1 if they have. |

| INDEX_COLUMN table | | |
|---|---|---|
| pschema | integer | Physical schema id. |
| index | integer | Index id. |
| position | integer | Relative position of column. |
| column | integer | Column object id. |
| column_size | smallint | Length in bytes of column. |
| descending | smallint | 1 if column is inserted in descending order. |
| datatype | smallint | Column datatype. |
| direct_count | integer | Number of equality lookups on this column. |
| range_count | integer | Number of inequality lookups on this column. |
| lookup_size | integer | |
| map_min | integer | minimum integer value of index range. |
| map_max | integer | maximum integer value of index range. |

For all subsequent candidate indexes, the existing indexes are searched to find the best existing index that is similar to the candidate index. Best existing index is determined from the comparison of values $(k \times 10)+c$ where k is the number of left-most, or key, columns which match between an existing index and the candidate index, and c is the number of columns overall that match.

As an example, consider the following existing indexes:
employee ID, last name, first name
first name, last name, employee ID and a candidate index of
first name, employee ID. There is no key match between the candidate and the first existing index, and there is a single match in first name between the keys of the candidate and the second existing index. Both indexes include two column matches, first name and employee ID. Thus the match value for the first index is $(0+2=2)$ and for the second is $(10+2=12)$. The index column table carries in it the number of equality lookups in the column from all requests which utilize an index and the number of inequality lookups on the column. If only equality lookups are associated with columns, they may be reordered. For example, the first existing index above could be reordered to
first name, employee ID, last name and thus provide a match value of 22. By keeping track of the inequality lookups, the system avoids a change in the locations of columns within the index which would destroy the availability of the index to a more important inequality context.

If no best index is found, then the candidate index is used to create a new index and the process goes in to analyze the next context. If a best existing index is located, depending on the importance and type of the candidate index and the best existing index, the candidate index may be created as a new index or the best existing index may be reused or it may be modified to satisfy the current context.

Rules for reusing/modifying best existing index to satisfy context follow. The rules reference various parameters. An individual parameter is selectable for each rule by the user. By appropriate selection of parameter values, the system can be made more likely or less likely to reuse or modify already existing indexes. Parameters can also establish a preference for hashed or sorted indexes.

1. If both candidate and best existing indexes are hashed, they have the same number of columns and all the columns match, then reuse the best existing index.

2. If the best existing index is sorted, the candidate index is hashed, they have same number of columns and all the columns match, then reuse the best existing index.

3. If both indexes are sorted, they have the same number of columns and all the columns match in identity and position, then reuse the best existing index.

4. If the best existing index is sorted, the candidate index is either hash or sorted, the best existing index has more number of columns, the columns of the candidate index match, in identity and position, the leading segments of the best existing index, then reuse the best existing index.

5. If the best existing index is sorted, the candidate index is sorted, they have the same number of columns, and the columns match in identity, then change the best existing index to the candidate index only if absolute_importance of candidate is greater than (parameter * max_imp_of_best existing).

6. If the best existing index is hash, the candidate index is either hash or sorted, the best existing index has a lesser number of columns, and all the columns of the best existing index match in identity, then change the best existing index to include the candidate index only if absolute_importance is greater than (parameter * max_imp_of_best_existing).

7. If the best existing index is hash, the candidate index is either hash or sorted, the best existing index has a greater number of columns, and all the columns of the best existing index match in identity, then change best existing index to the order and type of the candidate index only if absolute_importance is greater than (Parameter * max_imp_of_best_existing).

8. If the best existing index is sorted, the candidate index is either hash or sorted, the best existing index has a lesser number of columns, and the columns of the best existing index match in identity, then change the best existing index to the candidate index only if absolute_importance is greater than (parameter * max_imp_of_best_existing).

9. If some of the columns match between both the indexes then reuse the best existing index only if absolute_importance is less than (parameter * max_imp_of_best_existing). This rule allows for partial indexing based on the best existing index. Where a context is not of sufficient importance to warrant establishment of a new index, the existing index can be used. A greater number of records might then be accessed than if a full index were used, but the records would then be evaluated individually.

Figure 6:
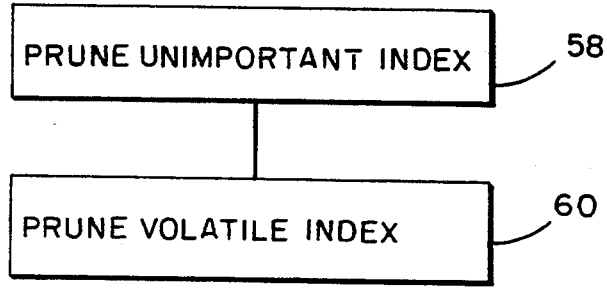
FIG. 6 is a flow chart of the index pruning of FIG. 4.

After all of the contexts have been analyzed, a set of potential indexes is identified in the index table. The next step of the index design 30 is index pruning 56 of FIG. 6. Indexes are pruned where they are considered not sufficiently important at 58 relative to their costs.

The importance of an index is computed as the sum of the absolute importances of requests which rely on the index. If that importance is less than a parameter times the sum importances of insert/delete requests on the indexed table, the index is pruned. The table importance and index importance are computed as follows:

tbl_imp = (tbl_max_imp * 100) + (tbl_avg_imp * 10) + tbl_sum_imp
tbl_imp = insert_delete_imp of table
tbl_max_imp = max importance of an insert_delete request on table
tbl_avg_imp = avg importance of all insert_delete request on table
tbl_sum_imp = sum importance of all insert_delete request on table
idx_imp = (idx_max_imp * 100) + (idx_avg_imp * 10) + idx_sum_imp
idx_imp = index importance
idx_max_imp = max importance of the request using the index
idx_avg_imp = avg importances of all the request using the index
idx_sum_imp = sum importances of all the requests using the index As before, the above preferred weighting values and those below may be user defined parameters.

Here, the table importance is considered the cost of maintaining the index in terms of having to insert and delete index entries when records in the table are inserted or deleted. Index importance is the benefit of maintaining the index for more direct accesses.

Next, indexes that are considered too volatile are pruned at 60. Those are the indexes of importance less than that of the product of a parameter and the importance of update requests that contain the index's columns. The column importance is computed as:

col_imp = (col_max_imp * 100) + (col_avg_imp * 10) + col_sum_imp
col_imp = volatile_importance of an update request on the column
col_max_imp = avg importance of all update requests on column
col_avg_imp — avg importance of all update requests on column
col_sum_imp — sum importance of all update requests on column.

The column importance is the cost of maintaining the index due to having to update the index with updates of records. The benefit is the index importance as computed above.

Figure 7:
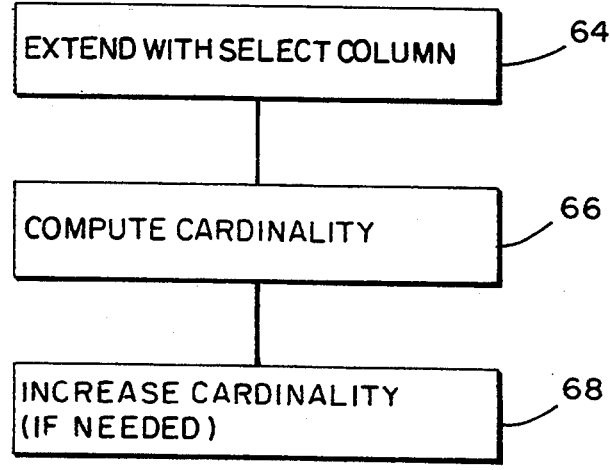
FIG. 7 is a flow chart of the index improvement of FIG. 4.

Once the indexes have been pruned at 56, they are further analyzed to determine whether they can be improved at 62 (FIG. 7). First, at 64, the select list is considered to determine whether an index may be extended by adding columns from the select list so as to perform an index only retrieval. For index only retrieval, the data entry from the record which is to be located through the index is actually stored in the index itself. The rules for adding columns for index only retrieval are as follows. Only a limited number of added columns are permitted for the most important requests. Index only retrieval is considered where:

1. The ratio of the number of matching columns between index and select list to the number of columns in the index should be greater than a parameter.

2. The number of mismatch columns must be less than a parameter.

The addition of the column must also meet other requirements. A threshold is computed for all request in the system from:

threshold=mean importance of requests+(parameter ×standard deviation of importance of all requests)

If the request importance is greater than the threshold, it is considered for select column retrieval. The best index for the request is located. If an index which includes the column is located, the column exists and nothing further need be done. If it does not exist, the rules of modification of indexes and the volatility requirement are considered. If the modified index meets these requirements, it is modified in the index table.

Next, cardinality of an index is computed at 66 for possible increase of cardinality by adding a column at 68. Cardinality is an indication of how many records are in a table for a particular key. With a primary key, there is a unique record for each entry in the index and cardinality of the index is the same as that of the table. If cardinality of the index is much less than that of the table, the selectivity of the index is poor and many duplicate records would be searched even after indexing. Rather than causing the database management system to search a list of duplicates, it can be forced to index as a pure B tree by adding a column. To that end, the cardinality of an index is computed and is based on the nature of columns in the index (primary keys) and/or the individual column cardinalities.

--- idx_card = table_card * (1 − factor)
factor = [1 − (col_1_card/tbl_card)] * [1 − (col_2_card/tbl_card)] ...

---

If the cardinality of an index is found to be less than a threshold, then the index may be extended by adding columns at 68. Finally, any resultant duplicate indexes are deleted.

The set of indexes may be analyzed with respect to specific operation of the optimizer of the database management system. Indexes which are not used by the optimizer or which prove too costly are removed. The indexes and requests may actually be fed to the optimizer, with statistics being maintained during operation of the optimizer. Alternatively, using the optimizer algorithms, each case may be simulated.

With all indexes now designed, the next step in the design of the physical database is in identifying a record placement strategy for the tables 34. If the most important index for a table is a hashed index then the records in the table are placed via the hashed index. If the most important index for a table is a sorted index, the table does not contain datatypes that cannot be sorted by the specific database system (for example segmented strings in Rdb/VMS) and its volatility is below a threshold value, then the records in the table are placed via the sorted index.

If the hashed or sorted placement of the records is not chosen from the above rules, the records are placed in the table via the database system default algorithm which is likely to be by order of arrival.

Figure 8:
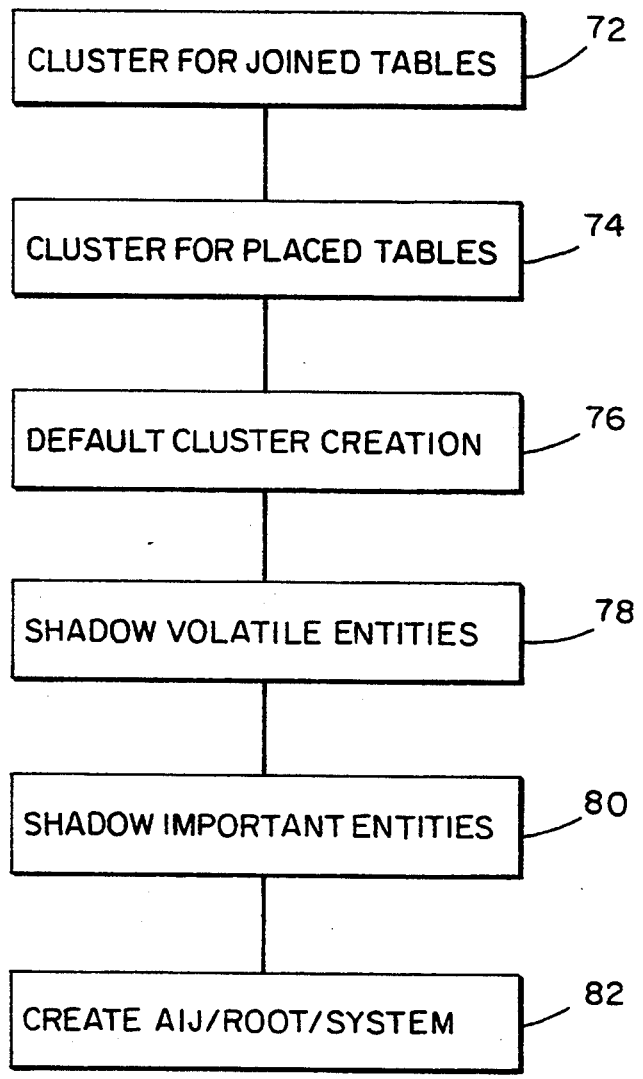
FIG. 8 is a flow chart of the cluster design of FIG. 2.

The next step in the physical database design process is the determination of initial cluster groups 36 (FIG. 8). A cluster group is defined as a set of related entities (e.g., joined tables and their indexes). By coincidental record clustering, both indexes and the tables placed by those indexes can be retrieved in a single I/O operation.

First, at 72, clusters are created of tables placed via hashed indexes that are joined using columns in the placement indexes. In that case, it is assumed that the tables have a parent/child relationship. Thus, the members of such a cluster are the tables that are joined and their placement hashed indexes.

The second set of clusters are created at 74 for tables placed via hashed indexes that are not yet in a cluster group. The members of such a cluster are the table and its placement hash index. Also at 74, clusters are created for tables placed via sorted index. Each such table is placed in a cluster and its placement sorted index is placed in another cluster.

The next cluster created at 76 is the default cluster of all the tables and sorted indexes that are not yet part of a cluster. For each hash index that is not yet in a cluster, a separate cluster is created. In case there exists support for segmented strings in the relational database system, then a separate default segmented string cluster is created.

From the default clusters so far, tables and segmented strings that have deviant insertion and deletion volatility are shadowed out into separate clusters at 78. Tables and segmented strings which have high insertion and deletion volatility are more likely to have changes in size which would later result in fragmentation of the cluster. It is desirable to insulate the less volatile tables from such fragmentation. An entity is considered to be deviant in volatility if its volatility is greater than the computed threshold volatility. Our measure of volatility is derived from a user-defined value.

--- threshold_volat = mean_volat + (std_dev_volat * param)
mean_volat = mean volatility of all the members in the cluster
std_dev_volat = standard deviation of member volatility in the cluster

---

From the default cluster and the default segmented string cluster, tables and segmented strings that have deviant importance are shadowed out into separate clusters at 80. In this way, important tables are not locked out by other tables and other tables are not locked out by the important tables during I/O operations of one or the other. An entity is considered to be deviant in importance if its importance is greater than the computed threshold importance.

--- threshold_imp = mean_imp + (std_dev_imp * param)
mean_imp = mean importance of all the members in the cluster
std_dev_imp = standard deviation of member importances in the cluster

---

Figure 9:
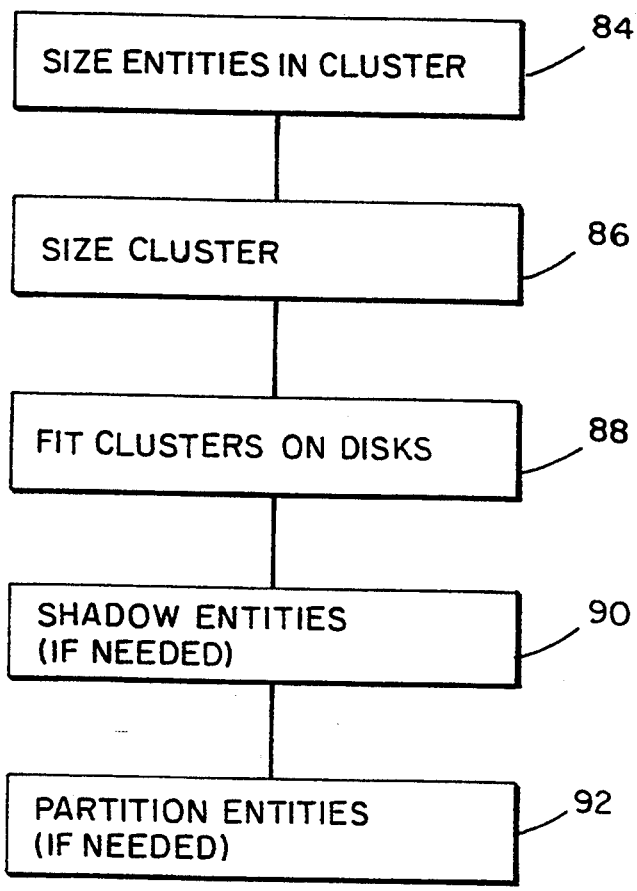
FIG. 9 is a flow chart of the cluster sizing and fit of FIG. 2.

If more than one cluster exists, then separate clusters are created at 82 for the rootfile, system tables and the After Image Journal (AIJ), if these features are supported in the relational database system. The next step 38 (FIG. 9) of the physical database design process is the sizing of each cluster group and determining if it can fit onto the user supplied environment (disk sizes). Sizes are computed at 84 from individual database specification but in general will be functions of parameters as follows:

```
Hsh_idx_siz = Function (record_size, number_of_column,
  overhead cardinality and
  expected_duplicates)
Srtd_idx_siz = Function (record_size, number_of_column,
  overhead, cardinality,
  expected_duplicates and
  read_wrt ratio)
  (read_wrt_ratio = (insert_delete_imp/read_imp)
Tabl_siz = Function (record_size, number_of_column,
  cardinality and overhead);
Segstr_siz = Function (Cardinality, avg_seg_length,
  avg_seg_count)
Mxd_page_cluster_siz = Function (member_sizes,
  volatility)
Unfrm_page_cluster_siz = Function (max_member_size,
  member_sizes)
System_cluster_siz = Function
  (number_and _type_of_system_entries)
system_entries are table, index, domain, view etc.
```

The cluster size 86 is then the sum of the previously designated entities. If there are not constraints on the disk sizes, then the initial clusters act as the basis for area definitions. If there are constraints on disk sizes and a cluster does not fit onto the disks at 88, then tables, indexes or segmented strings are iteratively shadowed out of the cluster to reduce its size so as to fit the user environment at 90. In general the least important table, index or segmented string is shadowed out of a cluster, except in case of the default cluster and the default segmented string cluster group wherein the most important table, index or segmented string is shadowed. For each shadowed table, index or segmented string a separate cluster is created. Finally, if all but one of the tables, indexes or segmented strings have been shadowed out of a cluster and it still cannot fit onto the user environment, then partitioning of the cluster is recommended at 92. Clusters containing rootfile, system tables or AIJ are never partitioned.

Figure 10:
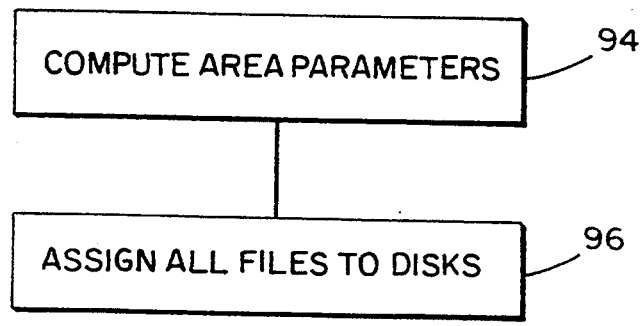
FIG. 10 is a flow chart of the area definitions of FIG. 2.

The next part of the physical database design process 40 is the area file definition 40 (FIG. 10). In this part, each cluster is mapped to an area file. If supported, the specific area file features like area types (read only), page size and format (mixed/uniform), initial allocation, growth, extents, SPAM thresholds and interval are computed at 94 based on the user supplied data volume and the workload analysis. Snapshot status and their sizes may also be computed and are based on the area definition and workload analysis.

```
SPAM threshold = Function (record_size, page_fullness)
Area_growth/extent = Function (volatility)
Snapshot_status = Function (read_modify_imp_ratio)
  read_modify_imp_ratio = (read_imp/modify_imp)
Snapshot_growth/extent = Function (volatility,
  read_wrt_ratio)
```

Area files and their snapshots can be assigned at 96 to disks based on the area importance, disk importance and the available space on the disk. Finally, data compression status on tables may be specified using the volatility values.

The final part of the physical database design process includes buffer recommendations. Buffer size and number of buffers are computed and are based on the user-defined environment, area page sizes and the workload analysis.

```
Buffer_size = Function (common_multiple_page_size,
  available_memory, number_of_users and
  access_type_ratio)
access_type_ratio = ((seq_imp_ + range_imp)/direct_imp)
```

While this invention has been particularly shown and described with references to preferred embodiments thereof, it will be understood by those skilled in the art that various changes in form and details may be made therein without departing from the spirit and scope of the invention as defined by the appended claims.

We claim:

1. For a database having plural tables, each of plural columns, stored in memory, a processor controlled method of generating indexes comprising:
   identifying importance values for individual database requests; and
   designing indexes to tables for the requests by identifying, by order of request importance, candidate indexes for requests, searching previously identified indexes for an index that is similar to each candidate index, and building upon previously identified indexes by reusing existing indexes and modifying existing indexes based upon match between indexes and upon importance values of requests for which the indexes are created.

2. A method as claimed in claim 1 wherein the importance value of a request is identified from expected frequency of processing and from individual importances of the request, a transaction which includes the request and a program which includes the transaction, with greater weighting toward transaction importance and greatest weighting toward program importance.

3. A method as claimed in claim 1 further comprising the steps of:
   identifying columns and associated operators for individual table contexts within each expression of each request; and
   identifying candidate indexes from the identified columns for individual contexts.

4. A method as claimed in claim 3 wherein the candidate indexes are ordered by request value of importance, the method further comprising, with identification of each candidate index, searching previously identified indexes for an existing index that is similar to the candidate index and choosing from the steps of a) creating a new index, b) reusing the best existing index and c) modifying the best existing index to satisfy the context of the candidate index, choice of steps a, b and c being dependent on match between the candidate index and the best existing index and the value of importance of the requests for which the indexes are identified.

5. A method as claimed in claim 4 wherein a best existing index is determined as a function of match of columns and keys of indexes, with greater weight being given toward match of keys.

6. A method as claimed in claim 4 wherein a candidate index is chosen only where the database management system uses indexes for the operators and data types of a respective context.

7. A method as claimed in claim 4 wherein a candidate index is identified only where the table of the context has sufficient cardinality.

8. A method as claimed in claim 4 wherein a candidate index is selected only where a column size is above a threshold size.

9. A method as claimed in claim 4 wherein the best existing index is reused for a candidate index if both indexes are hashed, both indexes have the same number of columns and all the columns match.

10. A method as claimed in claim 4 wherein the best existing index is reused if the best existing index is sorted, the candidate index is hashed, both indexes have the same number of columns and all the columns match in identity.

11. A method as claimed in claim 4 wherein the best existing index is reused if both indexes are sorted, both indexes have the same number of columns and all the columns match in identity and in position.

12. A method as claimed in claim 4 wherein the best existing index is reused if the best index is sorted, the candidate index is either hash or sorted, the best existing index has more columns and the columns of the candidate index match, in identity and in position, leading segments of the best existing index.

13. A method as claimed in claim 4 wherein the best existing index is changed to the candidate index if the best existing index is hash, the candidate index is sorted, the indexes have the same number of columns, the columns match in identity, and if importance of the candidate index exceeds a threshold relative to importance of the best existing index.

14. A method as claimed in claim 4 wherein the best existing index is changed to include the candidate index if the best existing index is hash, the candidate index is either hash or sorted, the best existing index has a lesser number of columns, all the columns of the best existing index match in identity to columns of the candidate index and the importance of the candidate index exceeds a threshold relative to importance of the best existing index.

15. A method as claimed in claim 4 wherein the best existing index is changed to the order and type of the candidate index if the best existing index is hash, the candidate index is either hash or sorted, the best existing index has more columns, all columns of the candidate index match in identity to columns of the best existing index and the importance of the candidate index is greater than a threshold relative to the importance of the best existing index.

16. A method as claimed in claim 4 wherein the best existing index is changed to the candidate index if the best existing index is sorted, the candidate index is either hash or sorted, the best existing index has a lesser number of columns, the columns of the best existing index match in identity and position, and the importance of the candidate index is greater than a threshold relative to the importance of the best existing index.

17. A method as claimed in claim 4 wherein the best existing index is reused if only some of the columns between the indexes match and the importance of the candidate index is less than a threshold relative to the importance of the best existing index.

18. A method as claimed in claim 1 further comprising the step of identifying index retrieval modes based on context operators.

19. A method as claimed in claim 18 wherein indexes are reused and modified as a function of importance and retrieval mode of an existing index and a candidate index.

20. A method as claimed in claim 1 further comprising the step of pruning indexes where a benefit of an index is determined to be less than a cost of the index in operation of the database management system.

21. A method as claimed in claim 20 wherein benefits are derived from importance of requests for which the index is identified and cost is derived from the importance of requests which result in changes to the indexed table.

22. A method as claimed in claim 21 wherein cost is derived from the importance of insert and delete requests on the indexed table.

23. A method as claimed in claim 21 wherein cost is derived from the importance of update requests on indexed columns.

24. A method as claimed in claim 1 further comprising the step of adding columns to indexes for index only retrieval.

25. A method as claimed in claim 1 further comprising the step of adding columns to indexes where the cardinality of the index is below a threshold.

26. A method as claimed in claim 1 further comprising the step of establishing hashed or sorted record placement strategy within selected tables dependent on importance and retrieval mode of indexes to the table and data types within the table.

27. A method as claimed in claim 26 further comprising establishing record placement strategy as a function of table volatility.

28. A method as claimed in claim 1 further comprising the step of establishing cluster groups including tables and indexes.

29. A method as claimed in claim 28 further comprising clustering together tables and hashed indexes where the tables are placed via the hashed indexes and the tables are joined using columns in the hashed indexes.

30. A method as claimed in claim 28 comprising clustering together tables and hashed indexes where the tables are placed via the hashed indexes.

31. A method as claimed in claim 28 further comprising assigning clusters to a plurality of devices as a function of importance of data within the clusters.

32. A method of physically designing a database having plural tables, each of plural columns, the method comprising:
 A) identifying an absolute importance value for each database request based on the individual importance of the request, a transaction which includes the request and the program which includes the transaction, with greater weighting toward transaction importance and with greatest weighting toward program importance;
 B) in a table index design:
  1. by order of request importance, identifying candidate indexes from the identified columns for individual contexts where:
   a. operator type of an associated operator is such that the database management system uses an index,
   b. column size is less than a threshold size, and
   c. column data type is permissible in an index;
  2. identifying candidate index retrieval modes, including by sorting and hash, as a function of operator;
  3. with identification of each candidate index, searching previously identified indexes for a best existing index that is similar to the candidate index and, where no best existing index is located, creating a new existing index from the candidate index and, where a best existing index is located, choosing from the steps of a) creating a new index, b) revising the best existing index and c) modifying the best existing index to satisfy the context of the candidate index, choice of steps a, b and c being dependent on importance of and retrieval mode of the candidate index and the best existing index, importance of an index being derived from absolute importance of requests for which the index is identified; and 4. pruning indexes where benefit of an index, derived from importance of the requests for which the index is identified, is less than cost of the index, derived from importance of insert and delete requests on the indexed table and update requests on indexed columns.

33. A method of physically designing a database having plural tables, each of plural columns, the method comprising:

A) identifying an absolute importance value for each database request based on the individual importance of the request, a transaction which includes the request and the program which includes the transaction, with greater weighting toward transaction importance and with greatest weighting toward program importance;

B) in a table index design:
1. by order of request importance, identifying candidate indexes from the identified columns for individual contexts where:
   a. the table of the context has sufficient cardinality,
   b. operator type of an associated operator is such that the database management system uses an index,
   c. column size is less than a threshold size, and
   d. column data type is permissible in an index;
2. identifying candidate index retrieval modes, including by sorting and hash, as a function of operator;
3. with identification of each candidate index, searching previously identified indexes for a best existing index that is similar to the candidate index and, where no best existing index is located, creating a new existing index from the candidate index and, where a best existing index is located, choosing from the steps of a) creating a new index, b) revising the best existing index and c) modifying the best existing index to satisfy the context of the candidate index, choice of steps a, b and c being dependent on importance of and retrieval mode of the candidate index and the best existing index, importance of an index being derived from absolute importance of requests for which the index is identified;
4. identifying a benefit of an index, derived from importance of the requests for which the index is identified, and identifying a cost of the index, derived from importance of insert and delete requests on the indexed table and update requests on the indexed table and update requests on indexed columns, and pruning indexes where the benefit is less than the cost;
5. adding columns to indexes for index only retrieval;

C) establishing hashed or sorted record placement strategy within tables, dependent on importance and retrieval mode of indexes to the table, data types within the table and table volatility;

D) establishing cluster groups including:

1. clustering together tables and hashed indexes where the tables are placed via the hashed indexes and the tables are joined using columns in the hashed indexes;
2. clustering together tables and hashed indexes where the tables are placed via the hashed indexes and not clustered in step 1;
3. clustering tables and indexes in separate clusters where the tables are placed via sorted indexes;
4. establishing a cluster for each hash index not clustered in step 1 and 2;
5. establishing clusters for tables of importance over a threshold which are not clustered in steps 1 through 4; and
6. establishing clusters for tables of volatility over a threshold; and
7. establishing clusters for system files; and E) sizing the clusters of step D to fit available storage areas and assigning clusters to storage areas.

34. A method as claimed in claim 33 further comprising the step of adding columns to indexes where the cardinality of the index is below a threshold.

35. A method as claimed in claim 33 wherein:

the best existing index is reused for a candidate index if both indexes are hashed, both indexes have the same number of columns and all the columns match;

the best existing index is reused if the best existing index is sorted, the candidate index is hashed, both indexes have the same number of columns and all the columns match in identity;

the best existing index is reused if both indexes are sorted, both indexes have the same number of columns and all the columns match in identity and in position;

the best existing index is reused if the best index is sorted, the candidate index is either hash or sorted, the best existing index has more columns and the columns of the candidate index match, in identity and in position, leading segments of the best existing index;

the best existing index is changed to the candidate index if the best existing index is hash, the candidate index is sorted, the indexes have the same number of columns, the columns match in identity, and if importance of the candidate index exceeds a threshold relative to importance of the best existing index;

the best existing index is changed to include the candidate index if the best existing index is hash, the candidate index is either hash or sorted, the best existing index has a lesser number of columns, all the columns of the best existing index match in identity to columns of the candidate index and the importance of the candidate index exceeds a threshold relative to importance of the best existing index;

the best existing index is changed to the order and type of the candidate index if the best existing index is hash, the candidate index is either hash or sorted, the best existing index has more columns, all columns of the candidate index match in identity to columns of the best existing index and the importance of the candidate index is greater than a threshold relative to the importance of the best existing index;

the best existing index is changed to the candidate index if the best exiting index is sorted, the candidate index is either hash or sorted, the best existing index has a lesser number of columns, the columns of the best exiting index match in identity and position, and the importance of the candidate index is greater than a threshold relative to the importance of the best existing index; and the best existing index is reused if only some of the columns between the indexes match and the importance of the candidate index is less than a threshold relative to the importance of the best existing index.

36. A method as claimed in claim 33 further comprising clustering segmented string data types together.

37. A method as claimed in claim 33 further comprising assigning clusters to storage areas as a function of importance of data within the clusters.

38. In a physical design system for a database having plural tables, each of plural columns, stored in memory, a processor and a physical design program stored in memory comprising:
  means for identifying importance values for individual database requests; and
  means for designing indexes to tables for the requests by identifying by order of request importance, candidate indexes, searching previously identified indexes for an index that is similar to each candidate index, and building upon previously identified indexes by reusing existing indexes and modifying existing indexes based upon match between indexes and upon importance values of requests for which the indexes are created.

39. A system as claimed in claim 38 wherein the means for identifying importance values identifies an importance value of a request from expected frequency of processing and from individual importances of the request, a transaction which includes the request and a program which includes the transaction, with greater weighting toward transaction importance and greatest weighting toward program importance.

40. A system as claimed in claim 38 wherein the means for designing indexes comprises:
  means for identifying columns and associated operators for individual table contexts within each expression of each request; and
  means for identifying candidate indexes from the identified columns for individual contexts.

41. A system as claimed in claim 40 wherein the candidate indexes are ordered by the means for designing and further comprising means for, with identification of each candidate index, searching previously identified indexes for an existing index that is similar to the candidate index and a) creating a new index, b) reusing the best existing index or c) modifying the best existing index to satisfy the context of the candidate index dependent on match between the candidate index and the best existing index and the values of importance of the requests for which the indexes are identified.

42. A system as claimed in claim 38 further comprising means for identifying index retrieval modes based on context operators.

43. A system as claimed in claim 42 wherein the means for designing reuses and modifies indexes as a function of importance and retrieval mode of an existing index and a candidate index.

44. A system as claimed in claim 38 further comprising means for pruning indexes where the benefit of an index is determined to be less than the cost of the index in operation of the database management system.

45. A system as claimed in claim 44 wherein benefits are derived from importance of requests for which the index is identified and cost is derived from the importance of requests which result in changes to the indexed table.

46. A system as claimed in claim 38 further comprising means for adding columns to indexes for index only retrieval.

47. A system as claimed in claim 38 further comprising means for adding columns to indexes where the cardinality of the index is below a threshold.

48. A system as claimed in claim 38 further comprising means for establishing hashed or sorted record placement strategy within selected tables dependent on importance and retrieval mode of indexes to the table and data types within the table.

49. In a physical design system for a database having plural tables, each of plural columns, stored in memory, a processor and a physical design program stored in memory comprising:
  A) means for identifying an absolute importance value for each database request based on the individual importance of the request, a transaction which includes the request and the program which includes the transaction;
  B) means for designing a table index including:
    1. means for identifying, by order of request importance, candidate indexes from the identified columns for individual context:
    2. means for identifying candidate index retrieval modes, including by sorting and hash, as a function of operator;
    3. means for searching with identification of each candidate index, previously identified indexes for a best existing index that is similar to the candidate index and, where no best existing index is located, creating a new existing index from the candidate index and, where a best existing index is located, a) creating a new index, b) revising the best existing index or c) modifying the best existing index to satisfy the context of the candidate index dependent on importance of and retrieval mode of the candidate index and the best existing index, importance of an index being derived from absolute importance of requests for which the index is identified; and
    4. means for pruning indexes where benefit of an index, derived from importance of the requests for which the index is identified, is less than cost of the index, derived from importance of insert and delete requests on the indexed table and update requests on indexed columns.

50. For a database having records stored in memory which are organized to include logically grouped and indexable data elements, a processor controlled method of generating indexes comprising:
  identifying importance values for individual database requests; and
  designing indexes to the database for the requests based upon importance values of requests for which the indexes are created by ordering requests by importance values, identifying, by order of request importance, candidate indexes for requests, searching previously identified indexes for an index that is similar, to each candidate index, and building previously identified indexes by reusing existing indexes and modifying existing indexes based upon match between indexes.

51. A method as claimed in claim 50 wherein the step of designing indexes comprises:

identifying columns and associated operators for individual table contexts within each expression of each request; and identifying candidate indexes from the identified columns for individual contexts.

* * * * *

UNITED STATES PATENT AND TRADEMARK OFFICE
CERTIFICATE OF CORRECTION

PATENT NO. : 5,404,510
DATED : April 4, 1995
INVENTOR(S) : Gregory S. Smith and Sangam Pant It is certified that error appears in the above-identified patent and that said Letters Patent is hereby corrected as shown below:

On the Title Page, Item [73], change "Digital Equipmetn Corporation" to --Oracle Corporation--.

In claim 35, Column 22, line 68, change "exiting" to --existing--; and Column 23, line 3, change "exiting" to --existing--.

In claim 50, column 24, line 65, after the word "similar" delete the comma.

Signed and Sealed this

Thirteenth Day of June, 1995

Attest:

BRUCE LEHMAN

*Attesting Officer*   *Commissioner of Patents and Trademarks*